United States Patent
Ishikawa et al.

(10) Patent No.: US 6,695,694 B2
(45) Date of Patent: Feb. 24, 2004

(54) GAME MACHINE, GAME DEVICE CONTROL METHOD, INFORMATION STORAGE MEDIUM, GAME DISTRIBUTION DEVICE, AND GAME DISTRIBUTION METHOD

(75) Inventors: Hirotaka Ishikawa, Tokyo (JP); Akinori Tamura, Tokyo (JP); Yasumi Takase, Tokyo (JP); Takashi Nishibori, Tokyo (JP); Kei Nagaoka, Tokyo (JP); Yoshiko Wada, Tokyo (JP); Yumi Yoshida, Tokyo (JP)

(73) Assignees: Konami Corporation, Tokyo (JP); KCE Tokyo, Inc., Tokyo (JP); People Co., Ltd., Tokyo (JP)

( * ) Notice: Subject to any disclaimer, the term of this patent is extended or adjusted under 35 U.S.C. 154(b) by 188 days.

(21) Appl. No.: 09/789,590

(22) Filed: Feb. 22, 2001

(65) Prior Publication Data

US 2001/0016510 A1 Aug. 23, 2001

(30) Foreign Application Priority Data

Feb. 23, 2000 (JP) ........................................ 2000-046538

(51) Int. Cl.[7] ............................ A63F 13/00; A63F 9/24; A63B 71/00
(52) U.S. Cl. ............................... 463/7; 463/36; 463/1; 482/8; 482/902; 482/9; 434/247; 434/250
(58) Field of Search ............................... 463/1, 4, 7, 8, 463/9, 36–38, 47; 482/1–8, 83–89, 51–53; 434/247, 258

(56) References Cited

U.S. PATENT DOCUMENTS

| | | | |
|---|---|---|---|
| 4,720,789 A | * 1/1988 | Hector et al. ................. 463/33 |
| 5,076,584 A | * 12/1991 | Openiano ..................... 463/36 |
| 5,139,261 A | * 8/1992 | Openiano ..................... 463/36 |
| 5,584,779 A | * 12/1996 | Knecht et al. ............... 434/250 |
| 5,667,459 A | * 9/1997 | Su ................................. 482/1 |
| 5,788,655 A | 8/1998 | Yoshimura et al. |
| 6,001,013 A | * 12/1999 | Ota ............................. 434/250 |
| 6,177,623 B1 | * 1/2001 | Ooseki ..................... 84/477 R |
| 6,227,968 B1 | * 5/2001 | Suzuki et al. ............... 434/250 |
| 6,320,110 B1 | * 11/2001 | Ishikawa et al. ........ 434/307 A |
| 6,410,835 B2 | * 6/2002 | Suzuki et al. ............... 434/250 |
| 6,450,886 B1 | * 9/2002 | Oishi et al. ................ 200/61.1 |

FOREIGN PATENT DOCUMENTS

| | | |
|---|---|---|
| EP | 0700661 | 3/1996 |
| EP | 0 974 382 A1 | 1/2000 |
| JP | 11-347021 A | 12/1999 |
| KR | 10-0195366 | 6/1999 |
| TW | 74925 | 2/1986 |
| WO | WO 96/05766 | 2/1996 |
| WO | WO 99/44698 | 9/1999 |

* cited by examiner

*Primary Examiner*—S. Thomas Hughes
*Assistant Examiner*—Alex F. R. P. Rada, II
(74) *Attorney, Agent, or Firm*—Sughrue Mion, PLLC

(57) ABSTRACT

To evaluate a game playing performance from a new point of view, a control method for controlling a game machine allowing a player to enjoy stepping while listening to game music, comprises the steps of detecting whether or not the player puts their foot or feet on each of a plurality of step positions; judging, based on a detection result on the step position, according to which, of a plurality of pattern changes, a state of the player's feet relative to the plurality of step positions has changed to; calculating, based on the determined pattern change, an energy consumption amount due to a change of the state of the player's feet; calculating an accumulative energy consumption amount by accumulating an energy consumption amount calculated after a predetermined timing; and reporting the accumulative energy consumption amount calculated to the player.

20 Claims, 11 Drawing Sheets

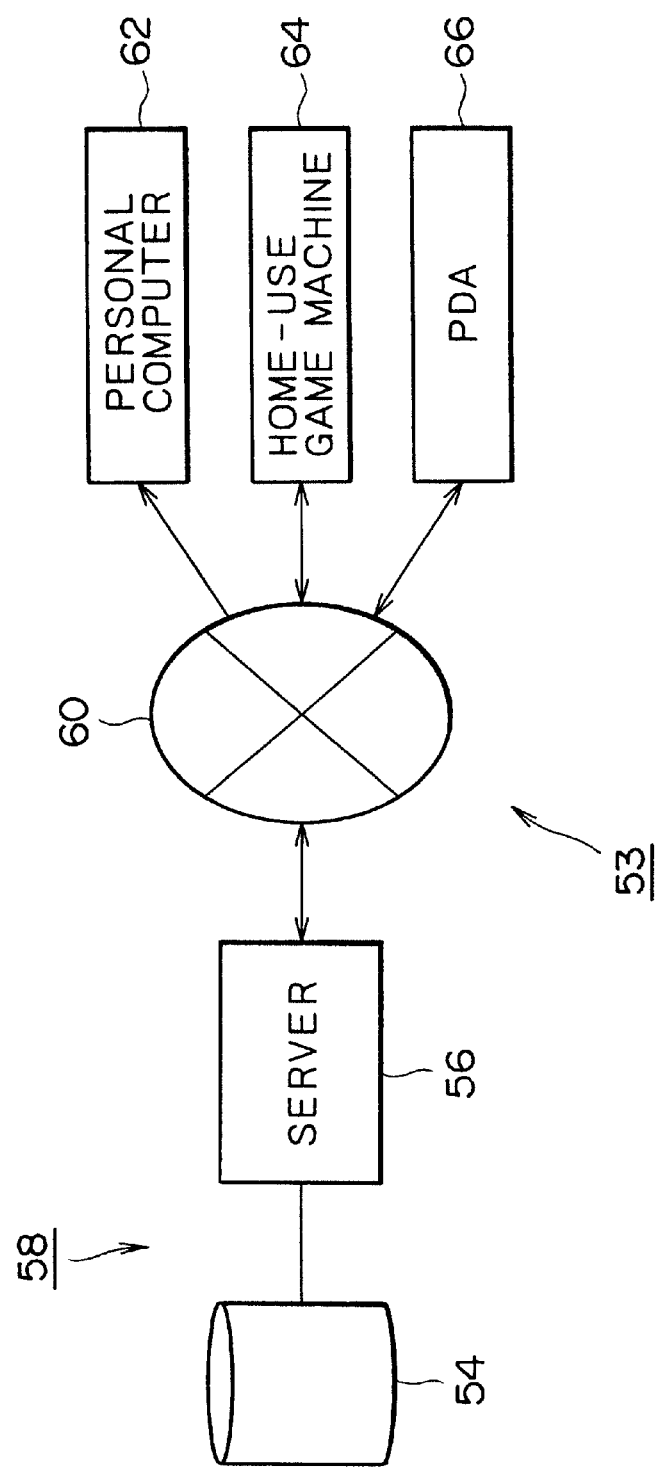

GAME MACHINE, GAME DEVICE CONTROL METHOD, INFORMATION STORAGE MEDIUM, GAME DISTRIBUTION DEVICE, AND GAME DISTRIBUTION METHOD

BACKGROUND OF THE INVENTION

1. Field of the Invention

The present invention relates to a game machine, a game machine control method, an information storage medium, a game distribution device, and a game distribution method. In particular, the present invention relates to a technique for enhancing attractiveness of a game in which, for example, a player enjoys dance steps while listening to game music.

2. Description of the Related Art

A music-oriented game machine employing a dedicated controller having a plurality of marks attached thereon each indicative of a step position defined thereon and a sensor for determining whether or not a player's foot or feet is/are placed on a particular step position, is popular. A typical example of such a game machine or software may include "Beat Mania™" and "Dance, Dance, Revolution™" both manufactured and sold by Konami Corporation. In these games, the player can enjoy the feeling of dancing by stepping on the dedicated controller in accordance with game music.

In such a music-oriented game machine, timing at which the player is required to step on each step position is determined according to the rhythm of game music and stored in the form of data, and a gradually approaching step timing is indicated on a display as for each of the plurality of step positions based on the step timing data. The player, referring to the display and listening to the music, puts their foot or feet on a guide step position or positions on the dedicated controller. The player's performance is evaluated based on the extent of difference between the timing at which the player actually stepped on the dedicated controller and the step timing defined by the step timing data. The player can enjoy the feeling of dancing in this manner, while taking notice of their game score.

In a conventional music-oriented game machine, the player's performance is evaluated simply based on the step timing defined by step timing data. However, when considering the distinctive feature of a music-oriented game such that the player does exercise to enjoy the feeling of dancing, it is desirable that the player's performance be evaluated from a point other than a game score, and to present this evaluation to the player. This can make even any games other than music-oriented games more attractive.

SUMMARY OF THE INVENTION

The present invention has been conceived in view of the above, and aims to provide a game machine which evaluates a player's game playing performance from new point of view so that the game becomes more attractive. The present invention also aims to provide a game machine control method, an information storage medium, a game distribution device, and a game distribution method for implementing such a game machine.

In order to achieve the above object, according to one aspect of the present invention, there is provided a game machine allowing a player to enjoy stepping while listening to game music, comprising step detection means for detecting whether or not the player puts their foot or feet on each of a plurality of step positions; change judgement means for judging, based on a detection result on the step position, according to which, of a plurality of pattern changes, a state of the player's feet relative to the plurality of step positions has changed to; energy consumption amount calculation means for calculating, based on the determined pattern change, an energy consumption amount due to a change of the state of the player's feet; accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

According to another aspect of the present invention, there is provided a control method for controlling a game machine allowing a player to enjoy stepping while listening to game music, comprising the steps of: detecting whether or not the player puts their foot or feet on each of a plurality of step positions; judging, based on a result of determination on the step position, which, of a plurality of pattern changes, a state of the player's feet relative to the plurality of step positions has changed to; calculating, based on the determined pattern change, an energy consumption amount due to a change of the state of the player's feet; calculating an accumulative energy consumption amount by accumulating an energy consumption amount calculated after a predetermined timing; and reporting the accumulative energy consumption amount calculated to the player.

In the present invention, a detection is made as to whether or not the player puts their foot or feet on each of the plurality of step positions, and a judgement is then made, based on the result of the detection, as to which, of a plurality of pattern changes, the state of the player's feet relative to the plurality of step positions has changed to. Further, based on the determined pattern change, how much energy the player has consumed by changing their feet's state is calculated. An energy consumption amount calculated after a predetermined timing is accumulated for calculation of an accumulative energy consumption amount. An accumulative energy consumption amount is reported to the player, for example, either in the form of a physical unit (such as calorie) or after commutation into an amount of food or exercise. As a result, the player can know an amount of energy they have consumed by playing the game. In other words, the player's game playing performance is evaluated from a new point of view, and reported to the player. This can resultantly impart a new point of enjoyment to a music-oriented game.

According to still another aspect of the present invention, there is provided a game machine, comprising a controller for inputting an operation signal; change judgement means for judging according to which, of a plurality of pattern changes, the operation signal input from the controller has changed to; energy consumption amount calculation means for calculating, based on the determined pattern change, the player's energy consumption amount corresponding to a change of the operation signal input from the controller; accumulative energy consumption amount calculation means for calculating an accumulative energy consumption amount by accumulating an energy consumption amount calculated after predetermined timing; and accumulative energy consumption amount reporting means for reporting the accumulative energy consumption amount calculated to the player.

According to yet another aspect of the present invention, there is provided an information storage medium storing a program for having a computer having a controller for inputting an operation signal, to function as a game machine having change judgement means for judging according to which, of a plurality of pattern changes, the operation signal input from the controller has changed to; energy consumption amount calculation means for calculating, based on the determined pattern change, the player's energy consumption amount corresponding to a change of the operation signal input from the controller; accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

According to yet another aspect of the present invention, there is provided a game distribution device for providing a game program for having a computer having a controller for inputting an operation signal, to function as a game machine having change judgement means for judging according to which, of a plurality of pattern changes, the operation signal input from the controller has changed to; energy consumption amount calculation means for calculating, based on the determined pattern change, the player's energy consumption amount corresponding to a change of the operation signal input from the controller; accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

According to yet another aspect of the present invention, there is provided a game distribution method for distributing a program having a computer having a controller for inputting an operation signal to function as a game machine having change judgement means for judging according to which of plurality of pattern changes the operation signal input from the controller has changed; energy consumption amount calculation means for calculating, based on the determined pattern change, the player's energy consumption amount corresponding to a change of the operation signal input from the controller; accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

In the present invention, the player inputs an operation signal via the controller to enjoy the game. The controller may comprise any means enabling input of an operation signal, the operation signal being indicative of, for example, whether or not a player puts their foot or feet on the respective step positions. In the present invention, according to which, of a plurality of pattern changes, the operation signals input via the controller have changed to is judged, and an amount of energy consumed by the player is calculated according to the judged pattern change. An energy consumption amount calculated after predetermined timing is accumulated for calculation of an accumulative energy consumption amount. An accumulative energy consumption amount is reported to the player, for example, either in the form of a physical unit (such as calorie) or after commutation into an amount of food or exercise. The reporting is made by means of displaying, audio output, or the like. As a result, the player can know an amount of energy they have consumed by playing the game. In other words, the player's game playing performance is evaluated from a new point of view, and reported to the player. This can resultantly impart a new point of enjoyment to a music-oriented game. In addition, according to a game distribution device and method of the present invention, a customer can easily obtain a game program which can evaluate a player's performance from a new point of view and report the evaluation to the player.

In one embodiment of the present invention, the machine may further comprise weight obtaining means for obtaining the player's weight. In the device, the energy consumption amount calculation means calculates an energy consumption amount based on the player's weight obtained by the weight obtaining means. This arrangement enables a report of a more reliable accumulative energy consumption amount to the player, the amount being calculated with consideration of the player's weight. This makes the game more attractive.

In another embodiment of the present invention, the game machine may further comprise tempo change obtaining means for obtaining a tempo change at which the state of the player's feet relative to the plurality of step positions changes. In the machine, the energy consumption amount calculation means calculates an energy consumption amount based also on the tempo change obtained by the tempo change obtaining means. A tempo change is information concerning a tempo according to which the player changes the state of their feet. Specifically, time necessary for the player to change the state of their feet from one state to another, the number of the states of the player's feet changing during a unit time period, the tempo of game music, and so on may be usable as a tempo change. This arrangement enables a report of a more reliable accumulative energy consumption amount to the player, the amount being calculated with consideration of a tempo change. This makes the game more attractive.

In yet another embodiment of the present invention, the above game machine may further comprise objective setting means for setting the player's objective in terms of an accumulative energy consumption amount; and objective attainment reporting means for reporting a state of attainment of the objective to the player based on the accumulative energy consumption amount calculated by the accumulative energy consumption calculation means. This arrangement allows the player to know how much of the required exercise to attain the objective they have accomplished so far (an objective attainment state). In this case, the objective setting means sets the objective based on at least one of an intake of a predetermined food, an amount of predetermined exercise, an objective weight, and an objective weight loss. When an intake of a predetermined food or an amount of predetermined exercise is used as a reference, the player can set an objective in a more intuitive manner. Alternatively, when an objective weight or an objective weight loss (a weight the player wishes to lose) is used as a reference, the play may be encouraged to continue playing the game.

In yet another embodiment of the present invention, the objective attainment reporting means estimates a play duration time necessary to attain the objective, based on an amount of energy consumed during past game playing performance, and reports the play duration time estimated to the player as a part of a report on the state of attainment of the objective. This arrangement allows the player to know how much more he needs to continue playing the game in order to attain an objective.

According to a yet another aspect of the present invention, there is provided a game machine allowing a player to enjoy stepping while listening to game music, comprising step detection means for detecting whether or not the player puts their foot or feet on each of a plurality of step positions; energy consumption amount calculation means for calculating, based on a detection result, an energy consumption amount due to a change of the state of the player's feet; accumulative energy consumption amount calculation means for calculating an accumulative energy consumption amount by accumulating an energy consumption amount calculated after predetermined timing; accumulative energy consumption amount reporting means for reporting the accumulative energy consumption amount calculated to the player; objective setting means for setting an objective for the player in terms of an accumulative energy consumption amount, using, as a reference, at least one of an intake of a predetermined food, an amount of predetermined exercise, an objective weight, and an objective weight loss; and objective attainment reporting means for reporting to the player a state of attainment of the objective based on the accumulative energy consumption amount calculated by the accumulative energy consumption amount calculation means.

In the present invention, whether or not the player puts their foot or feet on each of the plurality of step positions is detected, and an amount of energy the player has consumed by changing the state of their feet is calculated based on the detection result. An energy consumption amount calculated after a predetermined timing is accumulated for calculation of an accumulative energy consumption amount. An accumulative energy consumption amount is reported to the player. This arrangement, i.e., evaluation of the player's game playing performance from a new point of view and reporting to the player, can resultantly impart a new point of enjoyment to the game. Moreover, in the present invention, the player can set their objective in terms of an accumulative energy consumption amount using, as a reference, at least one of an intake of a predetermined food, an amount of predetermined exercise, an objective weight, and an objective weight loss, and receives reports regarding the state of their attaining the objective set. In other words, the player can set their own objective, and know the objective attainment state. When an intake of a predetermined food or an amount of a predetermined exercise can be used as a reference in setting an objective, the player can set their objective in a more intuitive manner. Alternatively, when an objective weight or an objective weight loss (a weight the player wishes to lose) can be used as a reference, the player may be encouraged to continue playing the game.

BRIEF DESCRIPTION OF THE DRAWINGS

The above and the other objects, features, and advantages of the present invention, will become further apparent from the following description of preferred embodiments taken in conjunction with the accompanying drawings wherein:

FIG. 11 is a diagram showing a complete structure of a game program distribution system according to another preferred embodiment of the present invention

PREFERRED EMBODIMENTS OF THE PRESENT INVENTION

The entire disclosure of the corresponding Japanese application 2000-46538 filed on Feb. 23, 2000, including specification, claims, drawings and summary, are incorporated herein by reference In the following, preferred embodiments of the present invention will be described in detail with reference to the accompanying drawings.

Figure 1:
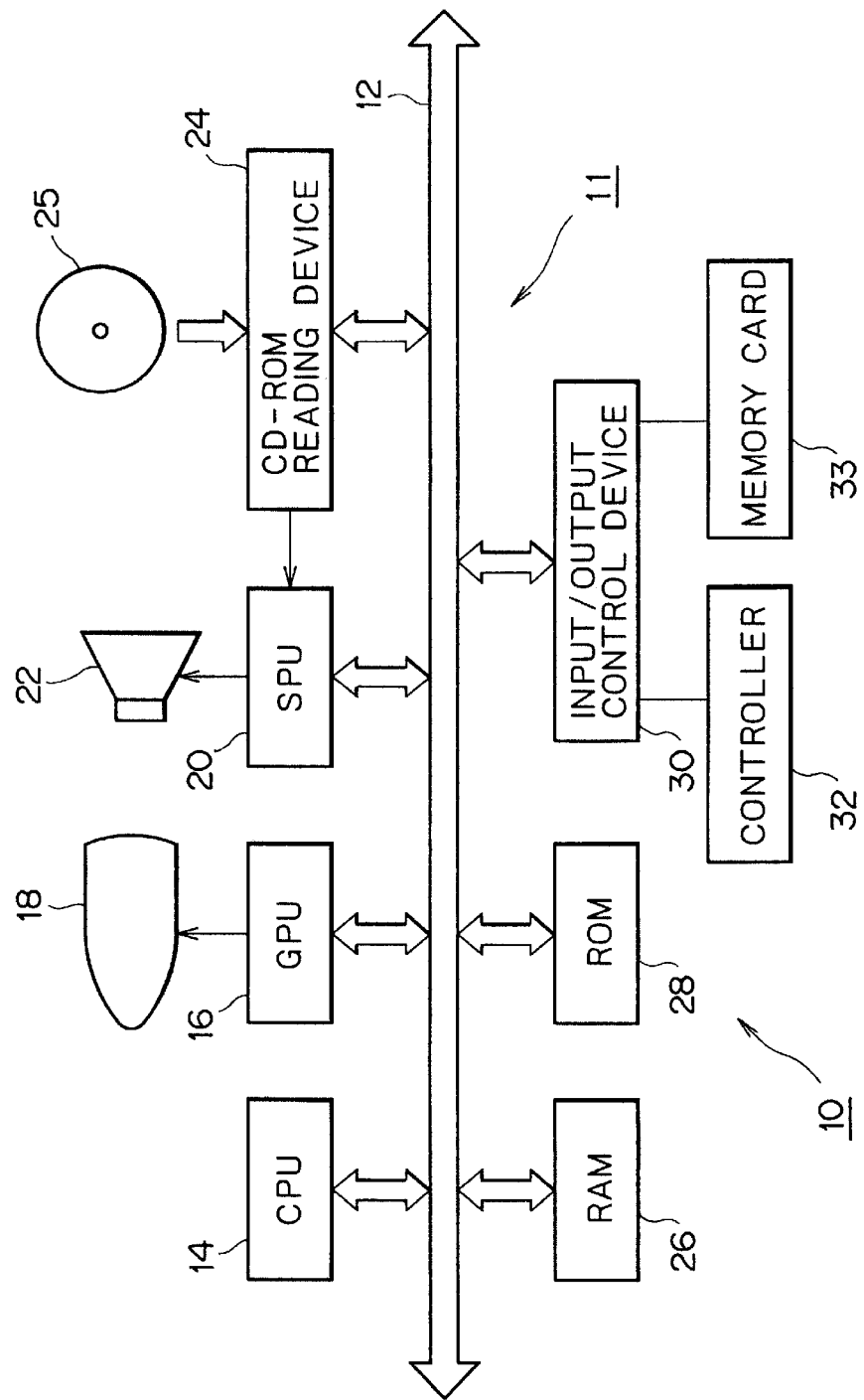
FIG. 1 is a diagram showing a structure of a game machine according to one preferred embodiment of the present invention.

FIG. 1 is a diagram showing a structure of a game machine according to a preferred embodiment of the present invention. In the following, a technology for having the shown game machine 10 function as a music-oriented game machine allowing the player to enjoy stepping while listening to game music will be described. The game machine 10 particularly has a "diet mode", which is a game mode encouraging the player to do exercise according to game music. In a "diet mode", where step timing is normally guided, a game will not end because of the player's stepping not following the guidance. The game ends in this mode only when the game music ends (a stage is completed) or the player applies a forcible game end instruction. This mode is featured by displaying an accumulative energy consumption amount the player has consumed by playing the game on a game screen. Moreover, the player can set their objective in terms of an accumulative energy consumption amount.

The game machine 10 shown in FIG. 1 comprises a CD-ROM 25, or an information storage medium, mounted on a home-use game machine 11, which in turn is connected to a monitor 18 and a speaker 22. Note that although a CD-ROM 25 is used here to supply a game program and game data to the home-use game machine 11, any other information storage media, such as a DVD or a ROM card, may be used instead. Alternatively, a game program and game data may be remotely supplied to the home-use game machine 11 via a communication network, as will be described later.

A home-use game machine 11 comprises a CPU 14, a GPU 16, an SPU 20, a CD-ROM reader 24, a RAM 26, a ROM 28, and an input/output control device 30, mutually connected via a bus 12 for data exchange, with the input/output control device 30 being further connected to a controller 32 via a cord. The respective elements of the home-use game machine 11 other than the controller 32 are all accommodated in a predetermined single housing. By way of example, the monitor 18 may be a home TV receiver, and the speaker 22 may be a speaker incorporated into the home TV receiver.

The CPU 14 has a structure comprising a micro processor, and controls the respective elements of the home-use game machine 11 based on an operating system stored in the ROM 26 and a game program read from the CD-ROM 25. The bus 12 is used for exchanging addresses and data among the respective elements of the home-use game machine 11. The ROM 28 stores an operating system, which is a basic program indispensable for comprehensive operation of the home-use game machine 11. The RAM 26 is used for storing game programs and game data read from the CD-ROM 25 as necessary. The GPU (graphics processing unit) 16, which has a structure comprising a frame buffer, receives image data from the CPU 14, and draws a game screen image in the frame buffer based on the received input data. The GPU 16, moreover, converts the content of the frame buffer into a video signal, and outputs the signal to the monitor 18 at a predetermined timing.

An SPU (sound processing unit) 20, which has a structure comprising a sound buffer, reproduces music data, game sound effects, and so on, which is read from the CD-ROM 25 and stored in the sound buffer, and outputs sounds via the speaker 22. The CD-ROM reader 24 reads a game program and game data from the CD-ROM 25 in response to an instruction from the CPU 14.

The input/output control device 30 is an interface for connecting one or more external input/output devices to the home-use game machine 11. A controller 32 is detachably connected to the control device 30 in this embodiment. Alternatively, an auxiliary storage device other than a memory card 33, or an external communication device, such as a modem or a terminal adapter, may be connected. The controller 32 is an input means via which a player operates a game. The input/output control device 30 periodically (for example, every 1/60 seconds) scans the operation state of the various buttons of the controller 32, and supplies an operation signal indicative of a scanning result to the CPU 14 via the bus 12. The CPU 14 judges the player's game operation based on the operation signal.

Figure 2:
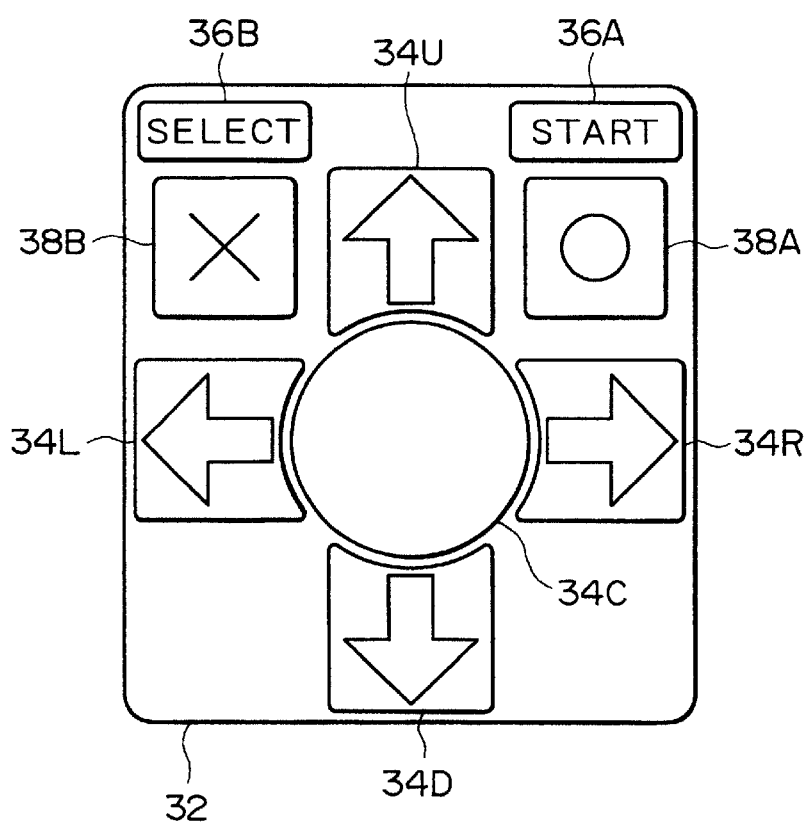
FIG. 2 is a diagram showing an appearance of an example of a controller.

FIG. 2 is a diagram showing an example of a controller 32. The controller 32 shown is a dedicated controller prepared particularly for a music-oriented game. The controller 32 is made of a mat-like member having a size appropriate for use as a dance stage. When a player steps on the controller 32, operation signals indicative of the positions of the player's feet are sent to the home-use game machine 11. As shown, a substantially round central segment 34C is provided at the center on the surface of the controller 32, and direction button input segments 34U, 34D, 34L, 34R are provided above, below, left of, and right of the central segment 34C, respectively. Further, to the right and to the left of the direction button input segment 34U are provided an O button input segment 38A and an X button input segment 38B, respectively. Moreover, a start button input segment 38A is provided above the O button input segment 38A, and a selection button input segment 36X is provided above the X button input segment 38B. On the direction button input segments 34R, 34L, 34U, 34D, a rightward arrow, a leftward arrow, an upward arrow, and a downward arrow are attached, respectively. An O mark (O) is attached (printed) on the surface of the O button input segment 38A, and an X mark (X) is attached on the surface of the X button input segment 38B. A label "START" is attached on the start button input segment 36A, and a label "SELECT" is attached on the selection button input segment 36X.

Sensors are embedded under the direction button input segments 34U, 34D, 34L, 34R, the O button input segment 38A, the X button input segment 38B, the start button input segment 36A, and the selection button input segment 36B, so that an operation signal indicating that the player's foot is placed on a corresponding segment is sent to the home-use game machine 11 when the player puts their foot on the respective segments. The direction button input segments 34U, 34D, 34L, 34R are mainly used to input dance steps as well as to make various menu selections. The start button input segment 36A is used to start a game as well as to make various decisions. The selection button input segment 36B is mainly used to retrieve various menu screens. The O button input segment 38A is mainly used to make various decisions. The X button input segment 38B is mainly used to apply various cancellations and to forcibly end the game.

Figure 3:
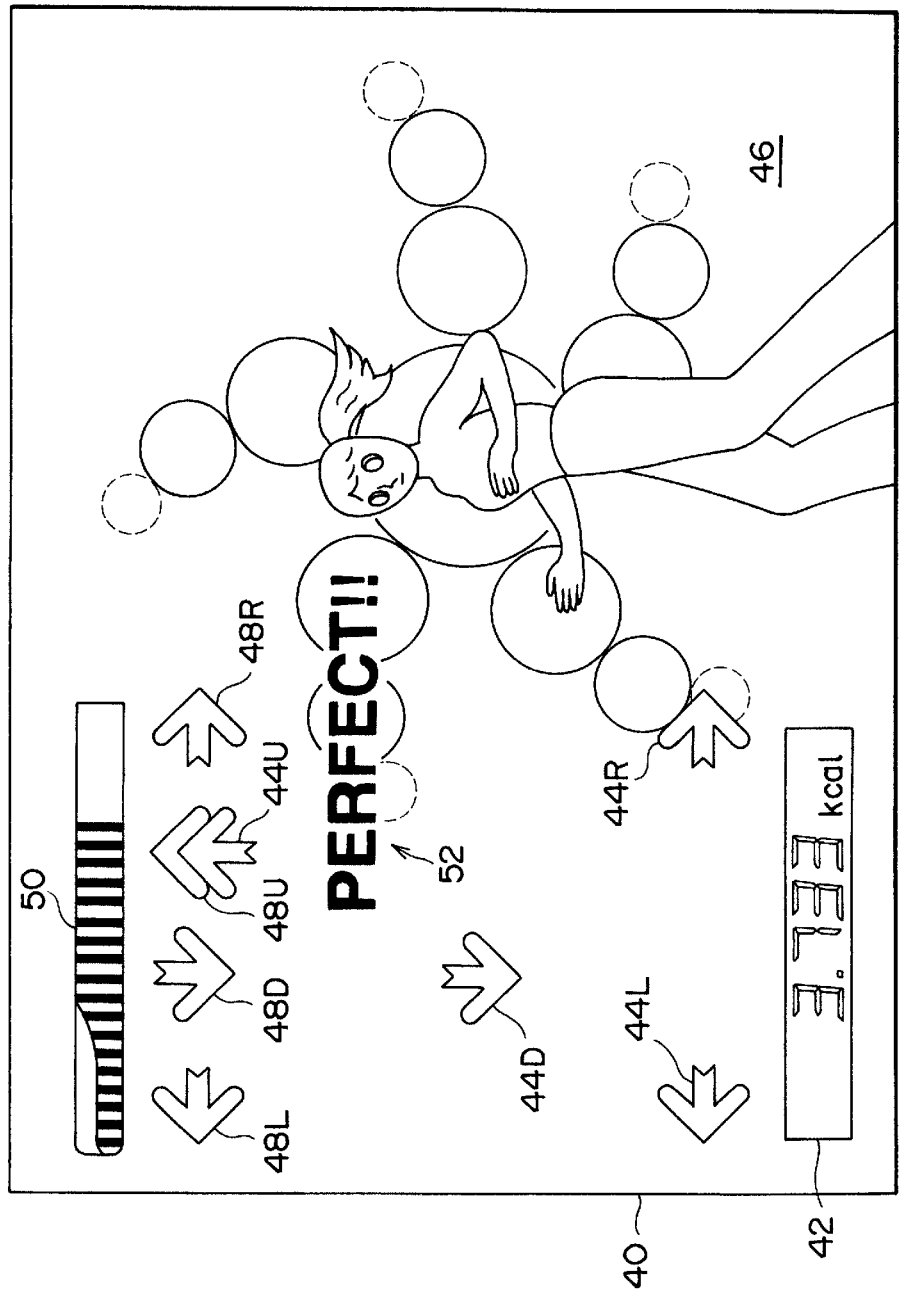
FIG. 3 is a diagram showing an example of a game screen image.

FIG. 3 is a diagram showing an exemplary game screen image prepared based on a game program and game data read from the CD-ROM 25, and shown on the monitor 18. The shown game screen image 40 appears in a "diet mode", in which a background image is displayed over the entire screen with the dance gauge 50, the reference arrows 48L, 48D, 48U, 48R, timing guidance arrows 44L, 44D, 44U, 44R, an energy indication 42, and a message 52 superimposed thereon. The energy indication 42, which is shown in the left lowermost part of the game screen image 40, indicates an accumulative amount of energy having been consumed from the predetermined timing, for example, the beginning of a "diet mode" to the present moment, the amount being shown in kilo calories (kcal). The message 52, which is shown in the center-left part of the screen, constitutes of an expression evaluating the player's operation, such as "Great", "Perfect", "Good", "Boo", and so on.

The dance gauge 50, which is shown in the left uppermost part in the screen image, comprises a gauge bar which extends or contracts depending on the finesse with which the game is operated. Specifically, the gauge bar may extend to the right in response to a highly evaluated step performance, and contract to the left in response to a poorly evaluated step performance. Referring to the dance gauge 50, the player can know evaluation of their step performance. Below the dance gauge 50 are shown reference arrows 48L, 48D, 48U, 48R in this order, which serve as a reference referred to by the player in determining step timing.

That is, the arrows 48L, 48D, 48U, 48R are correlated with the direction button input segments 34L, 34D, 34U, 34R, respectively. In a relatively large space below the reference arrows 48L, 48D, 48U, 48R, timing guidance arrows 44L, 44D, 44U, 44R are shown, which move upwards as time elapses. A player can obtain a higher score by stepping, at a time when each of the timing guidance arrows 44L, 44D, 44U, 44R overlap with a corresponding one of the reference arrows 48L, 48D, 48U, 48R, on a corresponding one of the direction button input segments 34L, 34D, 34U, 34R. Accordingly, the dance gauge 50 extends to the right. In the example of FIG. 3, where the timing guidance arrow 44U is about to overlap with the reference arrow 48U, a player stepping on the direction button input region 34U of the controller 32 at a time a little later than the timing shown in the drawing would obtain a higher score.

It should be noted that a player does not always have to operate the controller 32 at a very exact timing when the timing guidance arrows 44L, 44D, 44U, and 44R fully overlap the corresponding reference arrows 48L, 48D, 48U, 48R in order to get a score. A player can get a score that takes into consideration the extent of overlapping. Note that the timing guidance arrows 44L, 44D, 44U, 44r are displayed based on step data (described later).

The timing guidance arrows 44L, 44D, 44U, 44R are specifically displayed as follows. That is, after starting game music reproduction, the CPU 14 reads, from the step data, data on step timing within a guidance display range, and generates image data representing the timing guidance arrows 44L, 44D, 44U, 44R based on the step data. Note that a guidance display range is a range determined here as covering two bars subsequent to the current moment. Image data is configured such that a timing guidance arrow relative to the nearest operation timing is displayed in the uppermost part in the timing guidance arrow display area with those relative to farther operation timing displayed in lower parts accordingly.

In displaying the arrows, for example, the timing guidance arrow 44L, indicative of timing at which to step on the direction button input segment 34L, is shown below the reference arrow 48L, which is associated with this operation. Similarly, the timing guidance arrow 44D, indicative of timing at which to step on the direction button input segment 34D, is shown below the reference arrow 48D, which is associated with this operation; the timing guidance arrow 44U, indicative of timing at which to step on the direction button input segment 34U, is shown below the reference arrow 48U, which is associated with this operation; and the timing guidance arrow 44R, which is indicative of timing at which to step on the direction button input segment 34R, is shown below the reference arrow 48R, associated with this operation. It should be noted that, although a single guidance arrow 44L, 44D, 44U, 44R is shown in a single column in this drawing, two or more timing guidance arrows 44L, 44D, 44U, 44R may be shown at the same time in a single column depending on the state of approaching step timing. The thus generated image data is being superimposed onto the background screen image 46, constituting a part of the game screen image 40. The above processing will be repeated in a predetermined cycle.

The head of the guidance display range corresponds to the currently playing point in game music, and the guidance display range shifts toward the end of the music by a predetermined amount for each process. Accordingly, the timing guidance arrows 44L, 44D, 44U, 44R gradually move upwards as the music progresses. With the timing guidance arrows 44L, 44D, 44U, 44R displayed as described above, a player referring to the game screen image 40 can easily anticipate the arrival of step timing.

Next, data recorded in a CD-ROM 25 will be described. The CD-ROM 25 stores not only a game program, various game effect sound data, and various game image data, which are necessary to conduct a music game using a home-use game machine 11, but also game music data, which is necessary for executing a game program.

Figure 4:
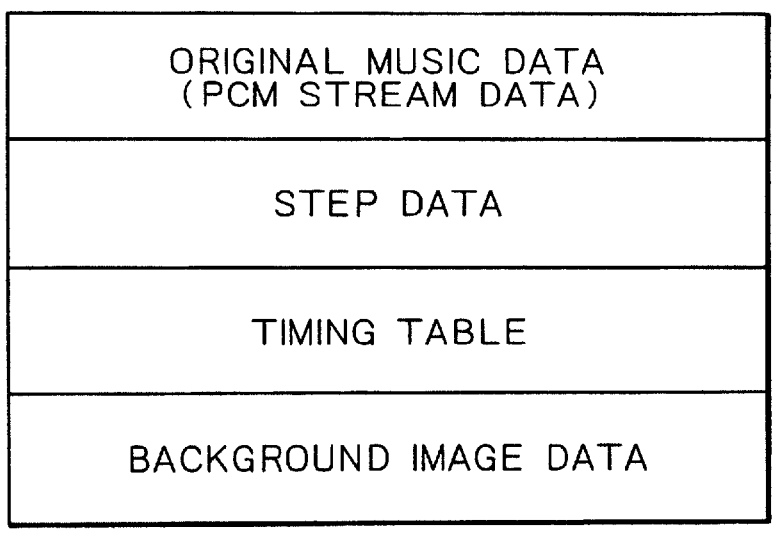
FIG. 4 is a diagram showing a structure of game music data.

FIG. 4 is a diagram describing game music data corresponding to some game music, recorded in a CD-ROM 25. As shown, game music data contains original music data, step data, timing tables, and background image data.

Original music data is data on, for example, general popular music which is stored as original music in the form of PCM streams and so on. In response to an instruction from the CPU 14, the CD-ROM reading device 24 reads original music data, and, if necessary, processes the data. Then, the CD-ROM reading device 24 can supply the data directly, i.e., without passing through the bus 12, to the SPU 20. The SPU 20 then converts the received music data into analogue data, and supplies the converted data to the speaker 22.

Step data defines a procedure of controller operation for a player to perform in reproduction of corresponding game music. Step data is configured according to the rhythm of corresponding music data. Two or more sets of step data may be prepared for a single set of game music data so that a desirable set of step data may be selected depending on a difficulty level, a play mode, and so on. Step data contains a plurality of data blocks each corresponding to each bar of corresponding game music. Each data block contains information concerning which of the buttons of the controller 32 should be operated at which beat in a corresponding music block when the bars are dissolved into blocks each for a predetermined beat number such as four beats or eight beats.

A timing table is prepared for matching the timing of corresponding game music with that of the step data. With reference to the timing table, the CPU 14 can specify step data corresponding to the currently playing point in the corresponding game music. Background image data, either motion or still image data, is used for displaying a background image 46 in the game screen image 40, shown, for example, in FIG. 3. A background image suitable for the atmosphere of game music is selected for every game music data to visually stimulate the player.

Figure 5:
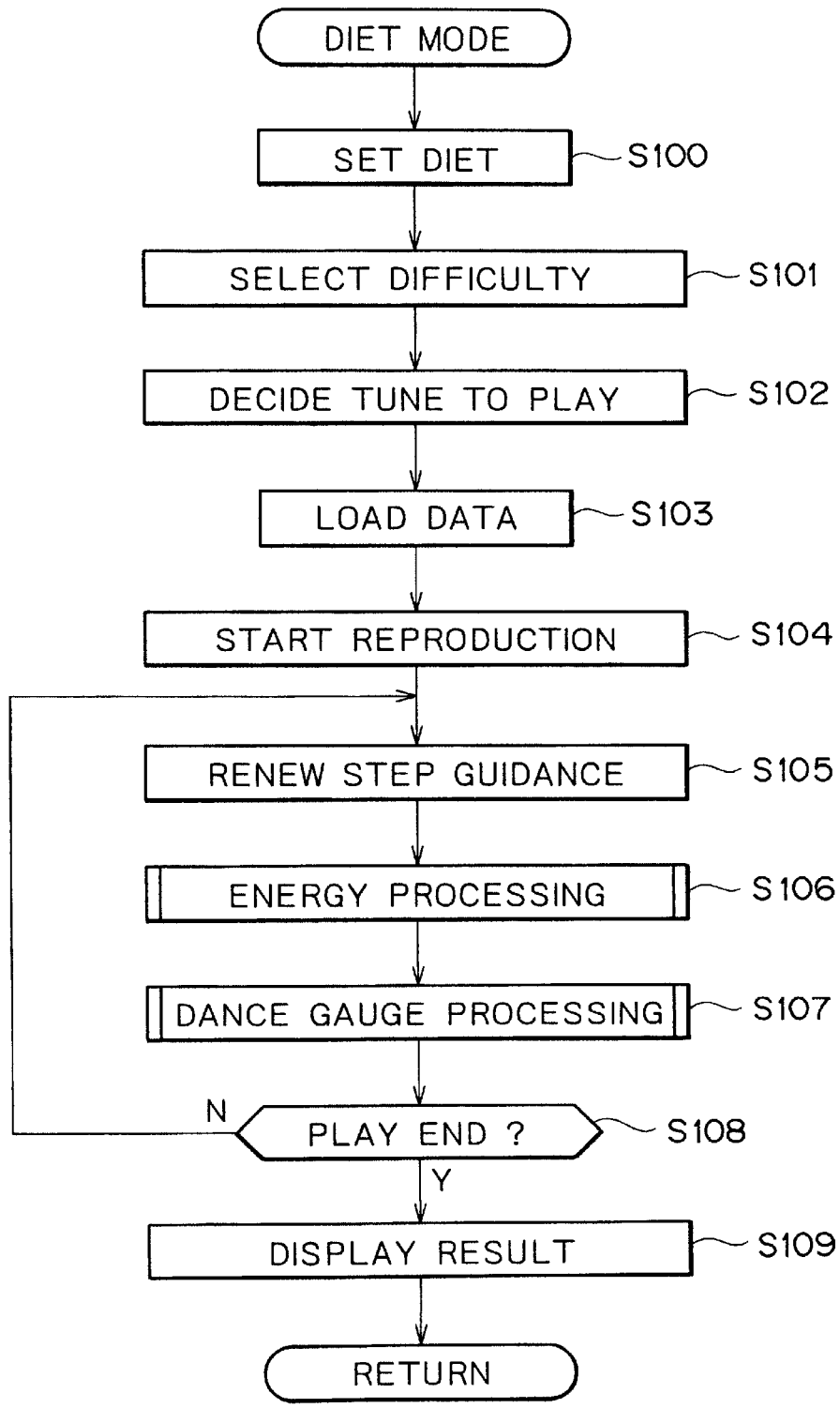
FIG. 5 is a flowchart explaining operation of a game machine according to one preferred embodiment of the present invention.

Here, next described is game program processing executed in the home-use game machine 11. FIG. 5 is a flowchart explaining major processing carried out in the home-use game machine 11 by executing a game program stored in the CD-ROM 25. That is, when the player mounts a CD-ROM 25 in the CD-ROM reader 24 and turns on the home-use game machine 11, an operating system stored in the ROM 28 is executed, thereby starting various initial operations. During the initial operation, only a part of the game program, which is necessary for the present processing, may be read from the CD-ROM 25 and loaded to the RAM 26. According to the game program, a game title, and so on is displayed on the monitor 18. Thereafter, a main menu is displayed either automatically or under the control of the controller 32. When the player selects a "diet mode" in the menu, game processing in the diet mode, which is a characteristic feature of the game machine 10 of the present invention, begins.

Figure 6:
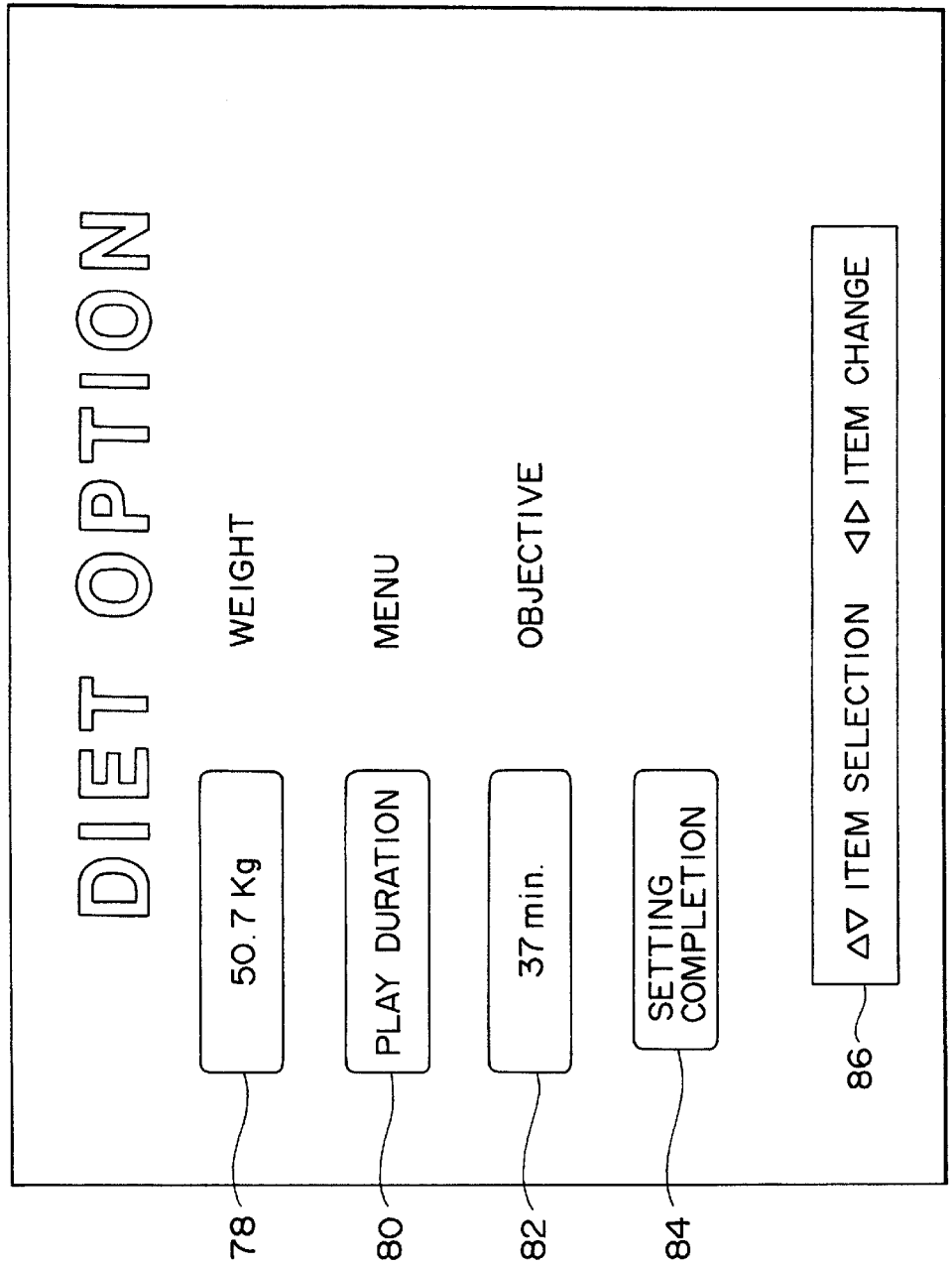
FIG. 6 is a diagram showing an example of a diet setting screen image.

In this mode, a diet setting menu is displayed on the monitor 18, in which the player conducts diet setting (S100). FIG. 6 shows an exemplary diet setting screen image then displayed. The shown diet setting screen image contains a weight input blank 78, an objective setting menu blank 80, an objective value input blank 82, a setting completion button 84, and guidance 86. The player inputs their weight into the weight input blank 78. Specifically, the player following the guidance 86 steps on the direction button input segments 34U and 34D to thereby bring a cursor into the blank, and then steps on the direction button input segments 34L and 34D to thereby input their weight value. A weight value can be input in one kilogram (kg) units for every 0.1 kg in the range between 10.0 kg and 200.0 kg. In the objective setting menu blank 80, any one of "no setting", "calorie consumption", and "play duration" can be selected. Selection of "calorie consumption" allows setting of an objective in the form of an energy amount (kilocalories). Accordingly, a label "kcal" appears in the objective value input blank 82. Subsequently, the player first steps on the direction button input segments 34U and 34D to thereby bring a cursor into the objective value input blank 82, and then steps on the direction button input segments 34L and 34R to thereby input an objective calorie consumption value. A calorie consumption value can be input in one kilocalorie (kcal) units in a range between 10 kcal and 1000 kcal.

Selection of "play duration" allows setting of an objective in the form of time (minutes). Accordingly, a label "mins" appears in the objective value input blank 82. Subsequently, the player steps on the direction button input segments 34U and 34D to thereby bring a cursor into the objective value input blank 82, and then steps on the direction button input segments 34L and 34R to thereby input a value for objective play duration. A play duration value can be set in one minute units in a range between one minute and 120 minutes. Selection of "no setting" cancels the objective setting.

A setting completion button 84 is a button for ending the diet setting. Specifically, when the player steps on the O button input segment 38A with a cursor on the setting completion button 84, the screen image shifts to a difficulty setting screen image (S101). For diet resetting, the player steps on the selection button input segment 36B with the difficulty setting screen image displayed, upon which the diet setting screen image is retrieved. Note that the value having been input and shown in the weight input bland 78 is hidden, for example, by a star mark in the retrieved diet setting screen image, so that unnecessary exposure of personal secret information can be prevented.

It should be noted that, whereas an objective is set in the form of "play duration" or "calorie consumption" in the above, an objective can alternatively be set using a predetermined food, such as an apple, rice, curry and rice, and cake, as a reference. Specifically, an objective can be set such as "equivalent to n apples", "equivalent to n bowls of rice", "equivalent to n dishes of curry and rice", "equivalent to n pieces of cake", and so on. Moreover, complex objective settings, such as "equivalent to n hamburgers and m glasses of orange juice" are convenient when the player wishes to consume energy in the game according to the food they actually ate. Still further, exercise, such as walking, swimming, and running, may be used as a reference. Specifically, an objective can be set such as "equivalent to n minutes of walking", "equivalent to n meters of swimming", "equivalent to n kilometers of running", and so on. Moreover, a player's objective may be set in the form of an objective weight or objective weight loss. In this case, a play duration time or an energy consumption amount required to attain an objective, or a standard play duration time per day or standard calorie consumption amount per day, may be presented to the player as a secondary objective. In order to calculate the standard energy amount, the player is required to input data, for example, concerning what or how much he ate that day so that the energy is calculated based on the input data. This arrangement makes the "diet mode" more attractive for players.

Figure 7:
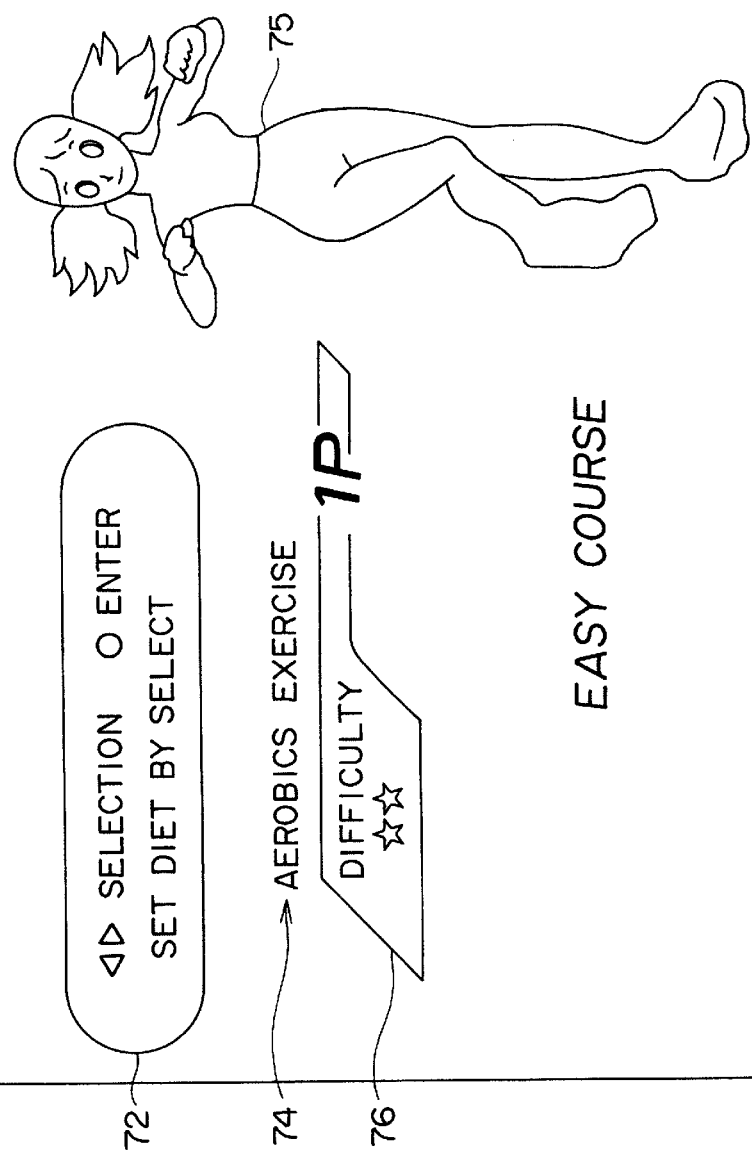
FIG. 7 is a diagram showing an example of a difficulty setting screen image.

As described above, by stepping on the O button input segment 38A with a cursor set on the setting completion button 84 in the diet setting screen image, a difficulty selection menu appears in the monitor 18, in which the player can set difficulty of the game (S101). "Difficulty" here means difficulty of step data. When a higher difficulty is set, more difficult step timing even for the same tune is selected and presented as guidance on the game screen image 40. FIG. 7 shows an example of a difficulty setting screen image. In the shown difficulty setting screen image, the difficulty varies in response to the player's stepping on the direction button input segments 34L and 34R with reference to the guidance 72. As the difficulty varies, corresponding messages 74 and an image 75 appear on the screen. The message 74 indicates an exercise the game at that difficulty level directs. For example, a description "aerobic exercise" and so on may appear. The message 76 indicates a difficulty level. The image 75 is a character image of a virtual dance instructor. As a different character appears for every difficulty level, serving as a symbol of that level, the player can intuitively know the currently selected difficulty level. As four difficulty levels are available here, the player can either begin at an easier level to gradually shift to a higher level or play at a level without imposing an excessive load for a long time.

When the player steps on the O button input segment 38A with reference to the messages 74, 76 and the image 75 in the difficulty setting screen image, the game level is fixed at that level, and the process thereafter shifts to music selection (S102). At S102, the player selects game music (a tune) to which he would like to dance, by stepping on the direction button input segments 34L and 34R, and then makes a selection by stepping on the O button input segment 38A. For music selection, an averaged energy consumption amount for each tune may be presented to the player because an amount of energy consumed by playing a game depends on the tempo of a tune to be played. Desirably, the guidance of an energy consumption amount is made also taking into consideration a difficulty level selected by the player because the stepping difficulty also affects an energy consumption amount due to playing the game. After determination of game music, game music data associated with that game music is read from the CD-ROM 25 (S103) and the game music then begins being reproduced (S104).

Subsequently, the CPU 14 generates image data for step guidance as shown in FIG. 3 based on the step data contained in the game music data read, and outputs the resultant image data to the monitor 18 for updating the step guidance (S105). For this purpose, the CPU 14 judges correspondence between the step data and the original music data with reference to the timing table. Note that step data and a timing table used here both correspond to the tune selected at S102 and the difficulty selected at S101.

Figure 8:
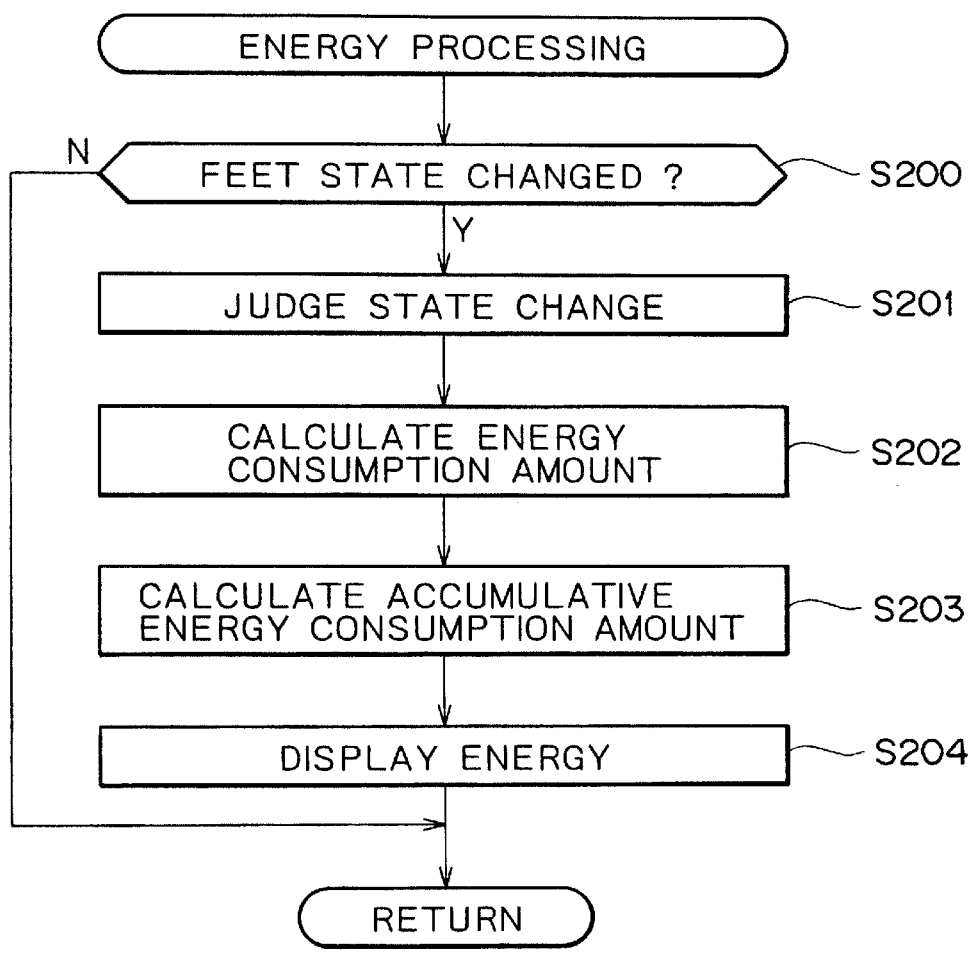
FIG. 8 is a flowchart explaining energy processing.

Energy processing is next carried out (S106). FIG. 8 is a flowchart explaining energy processing. In energy processing, an operation signal from the controller 32 is examined to determine whether or not the state of the player's feet has changed (S200). Specifically, among the operation signals sent from the controller 32 to the CPU 14 via the input/output control device 30, some of these signals, having been sent during a predetermined period immediately preceding the current moment, are stored in the RAM 26, so that the CPU 14 refers to the operation signals stored in the RAM 26 to judge whether or not the state of the player's feet has changed. It should be noted that, supposing that the player steps on one direction button input segment 34 and another direction button input segment 34 at only slightly different times, if not at exactly the same, it is judged that the player steps on the respective direction button input segments 34 at the same time. Also note that it is judged that the player has returned their foot to the central segment 34C, where no sensor is embedded, when a predetermined time has elapsed since the player lifted their foot from any direction button input segment 34.

Thereafter, state change analysis is made (S201). In this processing, which of the eight pattern changes (described later) the state of the player's feet has changed to is judged. The first pattern change is such that the player, with at least one of their feet on any one of the direction button input segments 34, lifts that foot from that direction button input segment 34 and then steps on the same input segment 34 again (P1). The second pattern change is such that the player, with both of their feet on the central segment 34C, lifts one of their feet from the central segment 34C and then steps with that foot on any direction button input segment 34 (P2). The third pattern change is such that the player, with at least one of their feet on any direction button input segment 34, lifts that foot and then steps with that foot on a direction button input segment 34 located at a right angle from that direction button input segment 34 (P3). The fourth pattern change is such that the player, with at least one of their feet on any direction button input segment 34, lifts that foot and steps with that foot on a direction button input segment 34 located at 180° from that direction button input segment 34 (P4).

The fifth pattern change is such that the player, with their feet on different direction button input segments 34, jumps up and steps with their feet on the respective same input segments 34 (P5). The sixth pattern change includes three sub-patterns; the first one is such that the player, with at least one of their feet on the central segment 34C, jumps up and then steps with their feet on the direction button input segments 34L and 34R, respectively (P6-1); the second one is such that the player, with their feet on the direction button input segments 34L and 34R, respectively, jumps up and then steps with one foot on the central segment 34C and with other foot on any direction button input segment 34 (P6-2); and the third one is such that the player, with one of their feet on either the direction button input segment 34U or 34D, jumps up and then steps with their feet on the direction button input segments 34U and 34D, respectively (P6-3).

The seventh pattern change includes two sub-patterns; the first one is such that the player, with at least one of their feet on the central segment 34C, jumps up and then steps with their feet on the direction button input segments 34U and 34D, respectively, or any two adjacent direction button input segments 34, respectively (P7-1); and the second one is such that the player, with their feet on the direction button input segments 34U and 34D, respectively, or any two adjacent direction button input segments 34, jumps up and then steps with one of their feet on the central segment 34C and with the other foot on any direction button input segment 34 (P7-2). The eighth pattern change is such that the player, with their feet on any different direction button input segments 34, jumps up and then steps with their feet on direction button input regions 34 different from those from which the respective feet were jumped up (P8).

Evaluation is made on the basis that the player consumes more energy going from the first to eighth pattern change. Because the player's right and left feet cannot be discriminated between according to an operation signal from the controller 32, the foot first moved is determined as "foot 1", and the other moved to other direction button input segment 34 with the "foot 1" fixed is determined as "foot 2". While thereafter tracing "foot 1" and "foot 2", which of the eight pattern changes (described later) the state of the player's feet have changed to is determined.

Next, an amount of energy the player has consumed by moving their feet is calculated (S202). The CD-ROM 25 has a table relating tempo changes, pattern changes, and energy consumption unit amounts with one another. Given a tempo change and a pattern change, the table can present a related energy consumption unit amount. A tempo change is information concerning a tempo at which the player changes the state of their feet, and specifically the tempo of game music here. Alternatively, an amount of time necessary to change the state of the player's feet from one state to another, or the number of the player's feet states changing within a unit time, and so on may be used as a tempo change. An energy consumption unit amount is an amount of energy, for every 1 kg of the player's weight, consumed by the player's changing the state of their feet according to a corresponding pattern change and game music having a corresponding tempo change. In the processing at S202, an energy consumption unit amount is obtained with reference to the table, using the tempo of game music and the pattern change judged at S201. Then, the obtained energy consumption unit amount and the player's weight set at S101 are put into a predetermined formula whereby an amount of energy the player has consumed by changing the state of their feet is calculated.

It should be noted that, whereas an energy consumption amount is calculated here as described above, a different type of table, such as one relating weight, tempo changes, pattern changes, and energy consumption unit amounts with one another may be used instead. Also, the table may be calibrated such that higher values thereof are determined having a predetermined interval. In that case, values are interpolated in calculation of an energy consumption amount.

Once an energy consumption amount is calculated, an accumulative energy consumption amount is then calculated (S203) Specifically, an amount of energy consumed during the current game playing and an amount of energy having been consumed since starting a "diet mode" are calculated. The energy consumption amount obtained at S202 is added to the accumulative energy consumption amount, which was previously calculated and stored in the RAM 26, to thereby obtain an accumulative energy consumption amount. For this purpose, an energy consumption amount first obtained at S202 after starting a "diet mode" or reproduction of any game music is stored in the RAM 26, and thereafter added by an energy consumption amount subsequently calculated at S202. The resultant value is again stored in the RAM 26. The above processing is repeated so that an accumulative energy consumption amount during the current game music and that during the "diet mode" are calculated.

The calculated accumulative energy consumption amount is written over the accumulative energy consumption amount currently stored in the RAM 26, and stored therein. In particular, an accumulative energy consumption amount after starting a "diet mode" is shown in kilocalorie units in the blank of energy indication 42 in the game screen image 40 appearing on the monitor 18 (S204). In addition, whether or not the objective set at S101 has been attained is determined. Bell sounds are output from the speaker 22 in the case where the objective is attained.

Figure 9:
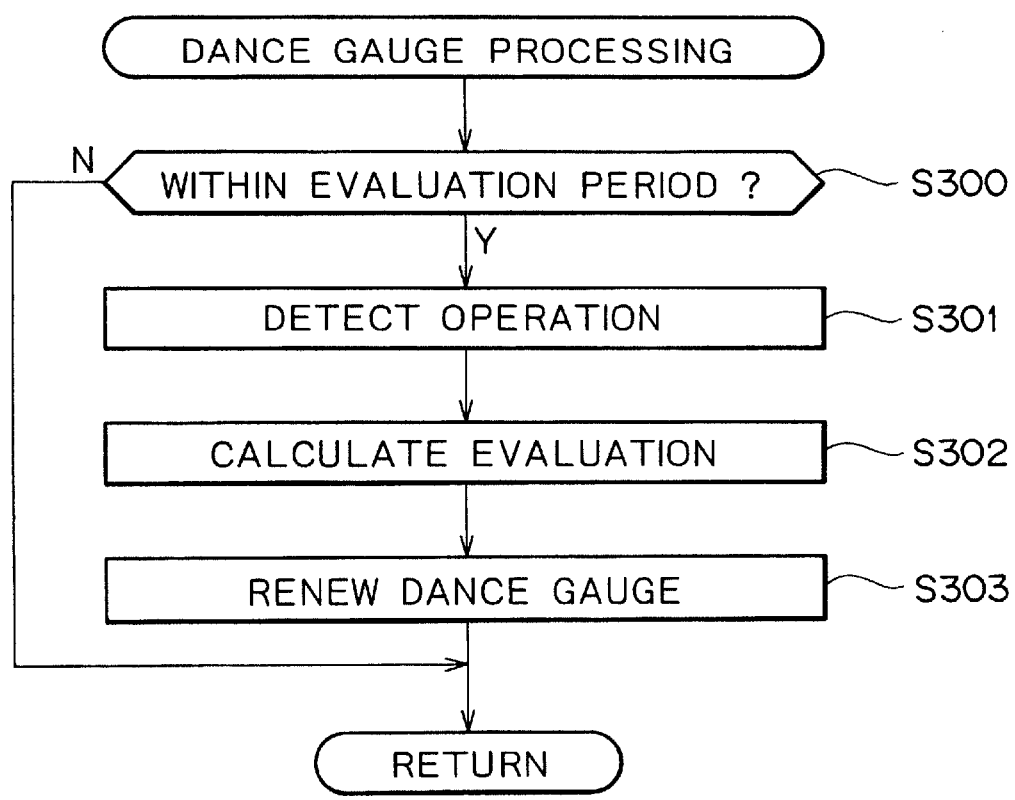
FIG. 9 is a flowchart explaining dance gauge processing.

Returning to FIG. 5, after completion of the energy processing (S106), dance gauge processing is carried out (S107) FIG. 9 is a flowchart explaining dance gauge processing. As shown, in the dance gauge processing, a determination is made based on the currently playing point of the game music and the step data, as to whether or not the currently playing point falls within an evaluation period (S300). An evaluation period is a period during which the player's step timing is to be compared with corresponding timing defined by the step data, and specifically determined as a period covering times preceding and following predetermined time amounts with respect to a certain moment defined as step timing according to the step data.

When a currently playing point of game music falls in an evaluation period, the operation state of the controller 32 is determined (S301), and the player's stepping performance is evaluated thereupon (S302). Here, by referring to the step data, it can be judged to which of the direction button input segments 34L, 34U, 34D, 34R the step position currently within an evaluation period relates. Therefore, a determination is made with reference to the step data as to whether or not a direction button input segment which must then be evaluated among the direction button input segments 34L, 34U, 34D, 34R is actually stepped on. In addition, an extent of difference between the actual step timing and the timing defined by the step data is also judged. A smaller difference in timing may get a higher evaluation. Specifically, the maximum score is given for no timing difference. Also, zero may be given for a maximum difference, and even a negative score may be given for a wrong operation of the direction button 34 or no operation registered. Note that when steps on two or more direction button input segments 34 must be evaluated at the same processing period, each step performance is similarly evaluated. The evaluation result is stored in the RAM 26. In addition, the last obtained score is added to the accumulated score, which is stored in the RAM 26, to thereby calculate a total score (S303). The total score is displayed as a score 42 (S109). Specifically, the gauge bar extends to the right for a high evaluation, and contracts to the left for a low evaluation. Further, a message 52 according to the evaluation acquired at step S302 is shown on the game screen image 40.

Returning to FIG. 5, the CPU 14 determines whether or not the game play satisfies game end conditions (S108). For example, the game play will end when the player continuously presses the X button input segment button 38B of the controller 32 over a predetermined time period or when the music has finished playing. When the game play end conditions are met, the player's entire game play performance is evaluated based on the content of the RAM 26, and the evaluation is displayed as a play result on the monitor 18 (S109). Under this condition, the player can continue playing the game if they wish. The game may be resumed after some rest for the player. On the other hand, when the end conditions are not met, the process returns to S105.

Figure 10:
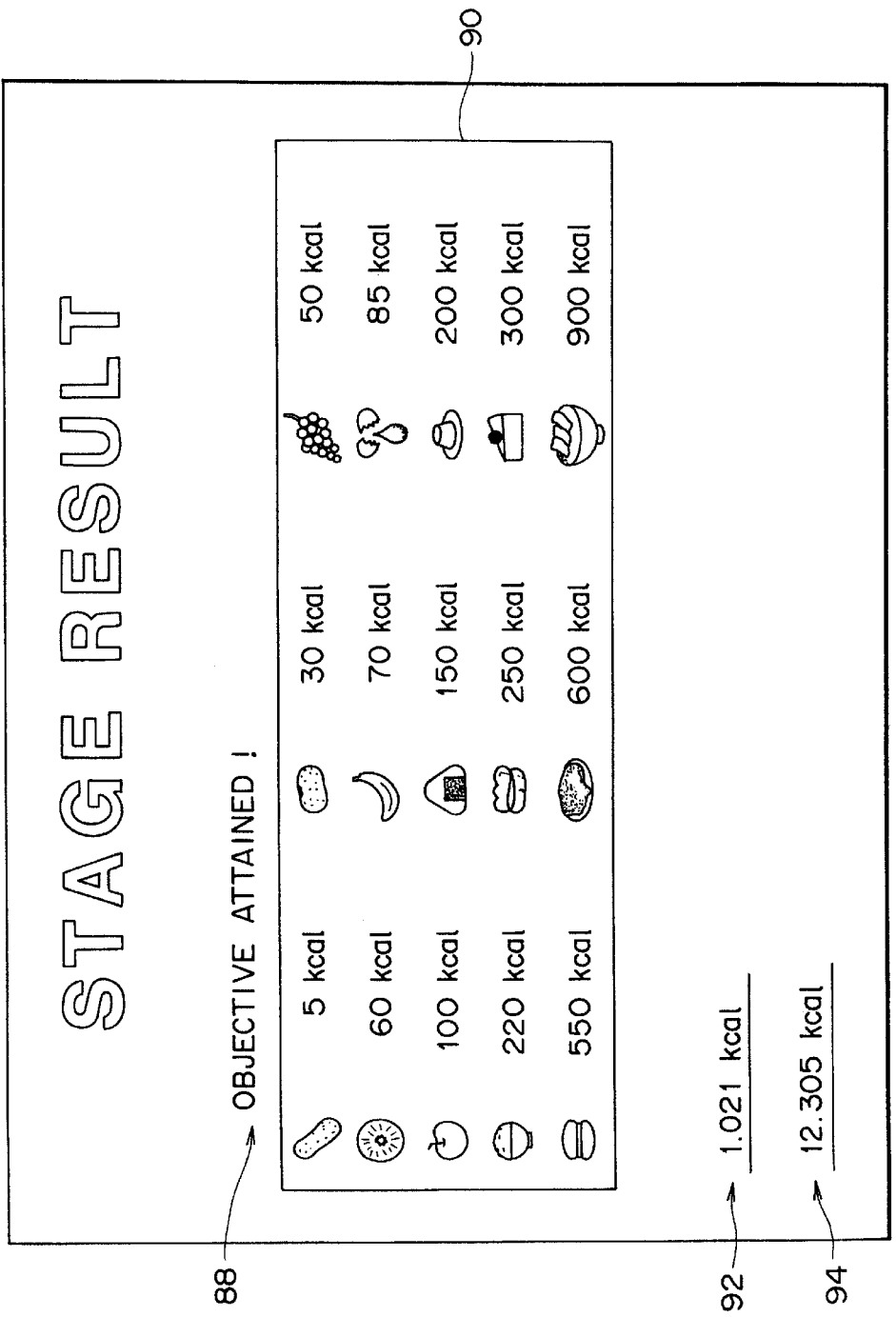
FIG. 10 is a diagram showing an example of a play result indication screen image.

FIG. 10 is a diagram showing an example of a play result indication screen image, which appears on the monitor 18 at S109. As shown, the play result indication screen image contains an objective attainment indicator 88, a sample energy consumption 90, an accumulative energy consumption amount per stage indicator 92, and an accumulative energy consumption amount in mode indicator 94. The accumulative energy consumption amount per stage indicator 92 indicates an energy amount the player consumed during the last game (per tune). The accumulative energy consumption amount in mode indicator 94 indicates a total energy amount the player has consumed since starting the "diet mode". Note that, whereas an energy consumption amount is expressed in kilo calorie units in the accumulative energy consumption amount per stage indicator 92 and the accumulative energy consumption amount in mode indicator 94 here, it may be expressed, for example, using a predetermined food (such as one apple and one bowl of rice) as a unit, to be specifically expressed as "equivalent to n apples", "equivalent to n bowls of rice", and so on.

An accumulative energy consumption amount after starting a "diet mode" is stored in the memory card 33, and may be used in calculating an energy amount the player has consumed throughout the entire game playing performance for display on the monitor 18. The memory card 33 may store various information, including the largest energy consumption amount for every stage (tune), an energy consumption amount accumulated throughout a predetermined number of past stages, the largest energy consumption amount recorded thus far, an averaged energy consumption amount, and so on. This arrangement enables presentation of various information to the player based on such information.

The objective attainment indicator 88 indicates how much of the exercise required to attain the objective set at S101 has been accomplished thus far. This indication is omitted in the case where "no setting" is set in the objective setting menu blank 80. With "calorie consumption" selected, the accumulative energy consumption amount after starting the "diet mode" is compared with the energy consumption amount set as an objective, and when the objective was achieved, a message "Objective Achieved!" is shown. When the objective was not achieved, on the other hand, the accumulative energy consumption amount is deducted from the objective energy consumption amount, so that a message "xx more kcals" is displayed. When "play duration" is selected in the objective setting menu blank 80, an actual play duration time is measured, and when the actual play duration time is longer than the play duration time set as an objective, a message "Objective Achieved!" is shown. For a shorter actual play duration time, the actual play duration time is deducted from the play duration time set as an objective, and the message "xx more mins" is shown based on the deduction result. The sample energy consumption 90 lists energies of major foods, in which, specifically, the major foods are represented by symbols each accompanied at the side by an associated energy value (in kilocalories).

Alternatively, for "calorie consumption" selected in the objective setting menu blank 80 with the objective not attained, an energy consumption during some stage may be divided by the time of that stage when clearing that stage whereby an energy consumption amount per unit time is calculated so that a message "xx mins more" is displayed based on the calculated energy consumption amount. That is, a play duration time required to attain the objective is estimated based on the energy consumption amount during past game playing performance, and an estimated play duration time may be displayed.

According to the game machine 10 described above, the player's performance in a music-oriented game is evaluated from a new point of view, i.e., an energy consumption amount, and presented to the player. This can resultantly impart a new point of enjoyment to the game. Moreover, new usage of a game machine 10, such as to use for diet, can be explored. That is, indication of an energy consumption amount contributes to enhancing attractiveness of a game.

It should be noted that a more sophisticated type of game machine 10 may be configured such that it once plays standard game music (turn) and then creates a music program (a diet program) suitable for the player based on their performance with the first game music for presentation to the player. Also note that a music program may be distributed via a communication network.

It should be noted that the present invention is not limited to the above.

For example, whereas the present invention is applied to a home-use game machine 11 in the above, the present invention can be similarly applied to a business use game machine. In this case, preferably, a faster storage device than a CD-ROM 25 and a built-in monitor 18 and speaker 22 may be used.

Further, whereas a CD-ROM 25 storing a game program and game data is used in a home-use game machine 11 in the above, any computer, such as a personal computer, and so on, which can read the content of an information storage medium storing a game program and game data, and carry out information processing based on the read content, may be used.

Still further, whereas the present invention is applied to a game machine 10 allowing the player to enjoy the sense of dancing in the above, the present invention can similarly be applied to various other types of music-oriented games, including a drum playing game in which the player beats a drum pad-shaped controller, and a guitar playing game in which the player operates a guitar-shaped controller. The present invention can be further applied to various sport games, including a ski game in which the player operates a controller formed imitating a ski or a ski pole, a snowboard game in which the player operates a snowboard-shaped controller, and a skateboard game in which the player operates a skateboard-shaped controller. The present invention is still further applicable to any kinds of game, including a combat game in which the player operates a controller formed imitating a gun, and a driving game in which the player operates a controller formed imitating a vehicle handle. In these applications, according to which, of a plurality of pattern changes, an operation signal from various controllers has changed to is judged, and the player's energy consumption amount corresponding to the pattern change indicated by an operation signal sent from the controller is calculated according to the judged pattern change. An energy consumption amount calculated after predetermined timing is accumulated to thereby calculate an accumulative energy consumption amount for reporting to the player. With this arrangement, the player's game playing performance can be evaluated from a new point of view, i.e., an energy consumption amount, which can arouse more interest in the player. In addition, diet effects brought about by playing the game can be appealing.

Still further, whereas a game program and game data are provided from a CD-ROM 25, or an information storage medium, to a home-use game machine 11 in the above, a game program and game data may be distributed through a communication network to each home. FIG. 11 is a diagram showing a complete structure of a game program distribution system utilizing a communication network. FIG. 11 is a diagram showing a complete structure of a game program distribution system utilizing a communication network. As shown, a game program distribution system 53 comprises a game database 54, a server 56, a communication network 60, a personal computer 62, a home-use game machine 64, and a PDA (Personal Digital Assistance) 66, wherein the game database 54 and the server 56 together constitute a game program distribution device 58. The communication network 60 may be, for example, the Internet or a cable television network. In this system, the game database 54 stores a game program and game data, similar to those stored in the CD-ROM 25. When a user makes a request for a distribution of a game, using the personal computer 62, the home-use game machine 64, the PDA 66, or the like, the request is forwarded to the server 56 via the communication network 60. In response to the request, the server 56 reads the game program and game data from the game database 54 and transfers them to the requesting entity, such as the personal computer, the home-use game machine 64, the PDA 66, or the like. Note that although a game distribution is effected in response to a game distribution request in the above, the server 56 may transmit them in a one-way manner. Also, game program and game data necessary for playing a game may not necessarily be all distributed at the same time, and only those necessary for each aspect of the game may be distributed at an appropriate timing. With game distribution via a communication network 60 as described above, a customer can easily obtain a game program and game data necessary for enjoying a music game.

What is claimed is:

1. A game machine allowing a player to enjoy stepping while listening to game music, comprising:

step detection means for detecting whether or not the player puts their foot or feet on each of a plurality of step positions;

change judgment means for judging, based on a detection result, which of a plurality of pattern changes a state of the player's feet relative to the plurality of step positions has changed to, thereby determining a pattern change;

energy consumption amount calculation means for calculating, based on the determined pattern change, an energy consumption amount due to a change of the state of the player's feet;

accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

2. A game machine according to claim 1, further comprising:

weight obtaining means for obtaining the player's weight, wherein the energy consumption amount calculation means calculates an energy consumption amount based on the player's weight obtained by the weight determination means.

3. A game machine according to claim 1 or claim 2, further comprising:

tempo change obtaining means for obtaining a tempo change at which the state of the player's feet relative to the plurality of step positions changes, wherein the energy consumption amount calculation means calculates an energy consumption amount based also on the tempo change determined by the tempo change obtaining means.

4. A game machine according to any one of claim 1 or claim 2, further comprising; objective setting means for setting the player's objective in terms of an accumulative energy consumption amount; and objective attainment reporting means for reporting a state of attainment of the objective to the player based on the accumulative energy consumption amount calculated by the accumulative energy consumption calculation means.

5. A game machine according to claim 4, wherein the objective setting means sets the objective based on at least one of an intake of a predetermined food, an amount of predetermined exercise, an objective weight, and an objective weight loss.

6. A game machine according to claim 4, wherein the objective attainment reporting means estimates a play duration time necessary to attain the objective, based on an amount of energy consumed during past game playing performance, and reports the play duration time estimated to the player as a part of a report on the state of attainment of the objective.

7. A game machine as recited in claim 1, wherein said plurality of pattern changes comprise at least a first and second pattern change, and a different energy consumption amount is allocated to each of said first and second pattern change.

8. A control method for controlling a game machine allowing a player to enjoy stepping while listening to game music, the method comprising:

detecting whether or not the player puts their foot or feet on each of a plurality of step positions; judging, based on a detection result, which of a plurality of pattern changes a state of the player's feet relative to the plurality of step positions has changed to thereby determining a pattern change;

calculating, based on the determined pattern change, an energy consumption amount due to a change of the state of the player's feet;

calculating an accumulative energy consumption amount by accumulating an energy consumption amount calculated after a predetermined timing; and reporting the accumulative energy consumption amount calculated to the player.

9. A control method for controlling a game machine as recited in claim 8, wherein said plurality of pattern changes comprise at least a first and second pattern change, and a different energy consumption amount is allocated to each of said first and second pattern change.

10. A game machine, comprising:

a controller for inputting an operation signal representing a pattern change;

change judgment means for judging which, of a plurality of pattern changes, the operation signal input from the controller has changed to, thereby determining a pattern change;

energy consumption amount calculation means for calculating, based on the determined pattern change, the player's energy consumption amount corresponding to a change of the operation signal input from the controller;

accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

11. A game machine as recited in claim 10, wherein said plurality of pattern changes comprise at least a first and second pattern change, and a different energy consumption amount is allocated to each of said first and second pattern change.

12. An information storage medium storing a program for having a computer having a controller for inputting an operation signal representing a pattern change, to function as a game machine having:

change judgment means for judging which, of a plurality of pattern changes, the operation signal input from the controller has changed to, thereby determining a pattern change;

energy consumption amount calculation means for calculating, based on the determined pattern change, the player's energy consumption amount corresponding to a change of the operation signal input from the controller;

accumulative energy consumption amount calculation means for calculating an accumulative energy consumption amount by accumulating an energy consumption amount calculated after a predetermined timing; and accumulative energy consumption amount reporting means for reporting the accumulative energy consumption amount calculated to the player.

13. An information storage medium as recited in said claim 12, wherein said plurality of pattern changes comprise at least a first and second pattern change, and a different energy consumption amount is allocated to each of said first and second pattern change.

14. A game machine allowing a player to enjoy stepping while listening to game music, comprising:

step detection means for detecting whether or not the player puts their foot or feet on each of a plurality of step positions;

energy consumption amount calculation means for calculating, based on a detection result on the step position, an energy consumption amount due to a change of the state of the player's feet;

accumulative energy consumption amount calculation means for calculating an accumulative energy consumption amount by accumulating an energy consumption amount calculated after a predetermined timing;

accumulative energy consumption amount reporting means for reporting the accumulative energy consumption amount calculated to the player;

objective setting means for setting an objective for the player in terms of an accumulative energy consumption amount, based on at least one of an intake of a predetermined food, an amount of predetermined exercise, an objective, and an objective weight loss; and objective attainment reporting means for reporting to the player a state of attainment of the objective based on the accumulative energy consumption amount calculated by the accumulative energy consumption amount calculation means.

15. A game machine allowing a player to enjoy stepping while listening to game music, comprising:

a plurality of step detectors for detecting whether or not the player puts their foot or feet on each of a plurality of step positions;

a change judgment portion for judging, based on a detection result, which of a plurality of pattern changes, a state of the player's feet relative to the plurality of step positions has changed to, thereby determining a pattern change;

an energy consumption amount calculation portion for calculating, based on the determined pattern change, an energy consumption amount due to a change of the state of the player's feet;

an accumulative energy consumption amount calculation portion for calculating an accumulative energy consumption amount by accumulating an energy consumption amount calculated after a predetermined timing; and an accumulative energy consumption amount reporting portion for reporting the accumulative energy consumption amount calculated to the player.

16. A game machine as recited in claim 15, wherein said plurality of pattern changes comprise at least a first and second pattern change, and a different energy consumption amount is allocated to each of said first and second pattern change.

17. A game machine, comprising:

a controller for inputting an operation signal representing a pattern change;

a change judgment portion which judges which of a plurality of pattern changes the operation signal input from the controller has changed to, thereby determining a pattern change;

an energy consumption amount calculation portion which calculates, based on the determined pattern change, the player's energy consumption amount corresponding to a change of the operation signal input from the controller;

an accumulative energy consumption amount calculation portion which calculates an accumulative energy consumption amount by accumulating an energy consumption amount calculated after predetermined timing; and an accumulative energy consumption amount reporting portion for reporting the accumulative energy consumption amount calculated to the player.

18. A game machine as recited in claim 17, wherein said plurality of pattern changes comprise at least a first and second pattern change, and a different energy consumption amount is allocated to each of said first and second pattern change.

19. A computer readable medium with a program code for having a computer having a controller for inputting an operation signal representing a pattern change, to function as a game machine comprising:

a change judgment portion for judging which of a plurality of pattern changes the operation signal input from the controller has changed to, thereby determining a pattern change;

an energy consumption amount calculation portion for calculating, based on the determined pattern change, the player's energy consumption amount corresponding to a change of the operation signal input from the controller;

an accumulative energy consumption amount calculation portion for calculating an accumulative energy consumption amount by accumulating an energy consumption amount calculated after predetermined timing; and an accumulative energy consumption amount reporting portion for reporting the accumulative energy consumption amount calculated to the player.

20. A computer readable medium with a program code for having a computer function as a game machine as recited in claim 19, wherein said plurality of pattern changes comprise at least a first and second pattern change, and a different energy consumption amount is allocated to each of said first and second pattern change.

* * * * *